United States Patent
Goode et al.

(10) Patent No.: US 8,329,835 B2
(45) Date of Patent: Dec. 11, 2012

(54) POLYETHYLENE COMPOSITIONS HAVING IMPROVED PROPERTIES

(75) Inventors: Mark G. Goode, Hurricane, WV (US); Rainer Kolb, Kingwood, TX (US); Chi-I Kuo, Humble, TX (US); Tae Hoon Kwalk, Belle Mead, NJ (US); Dongming Li, Houston, TX (US); Ching-Tai Lue, Sugar Land, TX (US); Francis C. Rix, League City, TX (US); Daniel P. Zilker, Jr., Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 93 days.

(21) Appl. No.: 12/739,313

(22) PCT Filed: Oct. 9, 2008

(86) PCT No.: PCT/US2008/011605
§ 371 (c)(1),
(2), (4) Date: Jan. 11, 2011

(87) PCT Pub. No.: WO2009/054888
PCT Pub. Date: Apr. 30, 2009

(65) Prior Publication Data
US 2011/0098422 A1 Apr. 28, 2011

Related U.S. Application Data

(60) Provisional application No. 60/999,902, filed on Oct. 22, 2007.

(51) Int. Cl.
*C08F 4/76* (2006.01)
*C08F 4/64* (2006.01)
*C08F 4/52* (2006.01)
*C08F 210/02* (2006.01)
*C08F 210/08* (2006.01)

(52) U.S. Cl. ........ 526/160; 526/170; 526/943; 526/941; 526/348.6; 526/348; 526/352

(58) Field of Classification Search ............... 526/348.6, 526/348, 352, 160, 170, 943
See application file for complete search history.

(56) References Cited

U.S. PATENT DOCUMENTS

| | | | |
|---|---|---|---|
| 5,281,679 A | 1/1994 | Jejelowo et al. | 526/114 |
| 5,470,811 A | 11/1995 | Jejelowo et al. | 592/117 |
| 5,753,785 A | 5/1998 | Reddy et al. | |
| 5,798,427 A | 8/1998 | Foster et al. | 526/352 |
| 6,339,134 B1 | 1/2002 | Crowther et al. | 526/128 |
| 6,388,115 B1 | 5/2002 | Crowther et al. | 556/11 |
| 6,506,866 B2 * | 1/2003 | Jacobsen et al. | 526/348 |
| 6,642,339 B1 * | 11/2003 | Chai et al. | 526/348.1 |
| 7,381,783 B2 * | 6/2008 | Loveday et al. | 526/352 |
| 2005/0033000 A1 * | 2/2005 | Ohta et al. | 526/348.1 |

(Continued)

FOREIGN PATENT DOCUMENTS
EP 0420436 4/1991
(Continued)

*Primary Examiner* — Rip A. Lee
(74) *Attorney, Agent, or Firm* — Jennifer A. Schmidt; Kristina Leavitt

(57) ABSTRACT

Polyethylene compositions having improved properties are provided. In one aspect, a polyethylene composition having a long chain branching index ($g'_{avg}$) of 0.5 to 0.9; a Melt Flow Rate (MFR) of greater than $(49.011 \times MI^{(-0.4304)})$, where MI is Melt Index; and a weight average molecular weight to number average molecular weight ($M_w/M_n$) of less than or equal to 4.6 is provided.

26 Claims, 5 Drawing Sheets

U.S. PATENT DOCUMENTS

| | | | |
|---|---|---|---|
| 2005/0049140 A1 | 3/2005 | Holtcamp | 502/102 |
| 2010/0298511 A1* | 11/2010 | Kuo et al. | 526/127 |

FOREIGN PATENT DOCUMENTS

| | | |
|---|---|---|
| EP | 0485823 | 5/1992 |
| WO | WO 94/07928 | 4/1994 |
| WO | WO 94/26793 A1 | 11/1994 |
| WO | WO 94/26816 A1 | 11/1994 |
| WO | WO 03/037938 | 5/2003 |
| WO | WO 03/064433 | 8/2003 |

\* cited by examiner

POLYETHYLENE COMPOSITIONS HAVING IMPROVED PROPERTIES

CROSS REFERENCE TO RELATED APPLICATIONS

This application is a National Stage application under 36 U.S.C. §371 of International Application No. PCT/US2008/011605, filed Oct. 9, 2008, that claims the benefit of Ser. No. 60/999,902, filed Oct. 22, 2007.

FIELD OF THE INVENTION

This invention relates generally to polyethylene compositions. The invention also relates to polymerization processes utilizing bridged metallocene catalysts for producing polyethylene compositions.

BACKGROUND OF THE INVENTION

Processability is the ability to economically process and shape a polymer uniformly. Processability involves such elements as how easily the polymer flows, melt strength, and whether or not the extrudate is distortion free. Typical metallocene catalyzed polyethylenes (mPE) are somewhat more difficult to process than low-density polyethylenes (LDPE) made in a high-pressure polymerization process. Generally, mPEs require more motor power and produce higher extruder pressures to match the extrusion rate of LDPEs. Typical mPEs also have lower melt strength which, for example, adversely affects bubble stability during blown film extrusion, and they are prone to melt fracture at commercial shear rates. On the other hand, however, mPEs exhibit superior physical properties as compared to LDPEs.

It is not unusual in the industry to add various levels of an LDPE to an mPE to increase melt strength, to increase shear sensitivity, i.e., to increase flow at commercial shear rates; and to reduce the tendency to melt fracture. However, these blends generally have poor mechanical properties as compared with neat mPE.

Traditionally, metallocene catalysts produce polymers having a narrow molecular weight distribution. Narrow molecular weight distribution polymers tend to be more difficult to process. The broader the polymer molecular weight distribution the easier the polymer is to process. A technique to improve the processability of mPEs is to broaden the products' molecular weight distribution (MWD) by blending two or more mPEs with significantly different molecular weights, or by changing to a polymerization catalyst or mixture of catalysts that produce broad MWD polymers.

In the art specific metallocene catalyst compound characteristics have been shown to produce polymers that are easier to process. For example, U.S. Pat. No. 5,281,679 discusses metallocene catalyst compounds where the ligand is substituted with a substituent having a secondary or tertiary carbon atom to produce broader molecular weight distribution polymers. U.S. Pat. No. 5,470,811 describes the use of a mixture of metallocene catalysts for producing easy processing polymers. U.S. Pat. No. 5,798,427 also addresses the production of polymers having enhanced processability using a metallocene catalyst compound where the ligands are specifically substituted indenyl ligands.

U.S. Pat. No. 6,339,134 (Crowther et al.) and U.S. Pat. No. 6,388,115 (Crowther et al.), describe a metallocene catalyst compound represented by the formula $L^A L^B MQ_n$, where $MQ_n$ may be, among other things, zirconium dichloride, and $L^A$ and $L^B$ may be, among other things, open, acyclic, or fused ring(s) or ring system(s) such as unsubstituted or substituted, cyclopentadienyl ligands or cyclopentadienyl-type ligands, heteroatom substituted and/or heteroatom containing cyclopentadienyl-type ligands. The Q ligands include hydrocarbyl radicals having from 1 to 20 carbon atoms.

PCT Publication No. WO 03/064433 ("Holtcamp"), relates to polymerization catalyst activator compounds that are either neutral or ionic and include a Group 13 atom, preferably boron or aluminum, bonded to at least one halogenated or partially halogenated heterocyclic ligand. The publication states that such activator compounds may be used to activate metallocene catalyst compositions. One such catalyst composition is cyclotetramethylenesilyl(tetramethyl cyclopentadienyl) (cyclopentadienyl)zirconium dimethyl(" $(C_4H_8) Si(C_5Me_4)(C_5H_4)ZrMe_2$").

SUMMARY OF THE INVENTION

This invention relates generally to polyethylene compositions having improved properties. The invention also relates to polymerization processes utilizing bridged metallocene catalysts for producing polyethylene compositions having improved properties.

According to an aspect of the present invention, there is provided a polyethylene composition having: $0.5 \leq g'_{avg} \leq 0.9$; $MFR > (49.011 \times MI^{(-0.4304)})$; and $M_w/M_n \leq 4.6$. In embodiments of the invention, the following features may be present.

The polyethylene composition may have one or more of the following features: $0.55 \leq g'_{avg} \leq 0.85$; $0.6 \leq g'_{avg} \leq$ about 0.8; $0.6 \leq g'_{avg} \leq$ about 0.7; $MFR > (57.18 \times MI^{(-0.4304)})$; about $2.0 \leq M_w/M_n \leq$ about 4.2; $0.75 \leq g'$ at a molecular weight of $100,000 \leq 0.95$; $0.5 \leq g'$ at a molecular weight of $500,000 \leq 0.85$; a T75–T25 value of equal to or lower than about 25 (or equal to or lower than 10), wherein T25 is the temperature at which 25% of the eluted polymer is obtained and T75 is the temperature at which 75% of the eluted polymer is obtained; an $MI \leq$ about 1.0, or $\leq$ about 0.8, or $\leq$ about 0.6; an MFR of about 50-150 at an MI of about 1.0; a melt strength of <10 cN; a density of 0.910-0.945 g/cc or 0.915-0.935 g/cc; and a strain hardening index of greater than 2, or greater than 2.5, or about 2.5 to about 3.7.

The composition may comprise as monomers ethylene, an olefin monomer having from 3 to 8 carbon atoms, and optionally one or more other olefin monomers having from 2 to 30 carbon atoms such as hexene or butene. The composition may comprise as monomers ethylene and butene. The composition may comprise as monomers ethylene, butene, and another olefin monomer having from 2 to 30 carbon atoms.

In another aspect, there is provided a film comprising a polyethylene composition described herein. The film may have one or more of the following features: an MD plastic shrink tension $\leq$ about 0.08 MPa; an area Retromat shrinkage >60%; a clarity $\geq$ 60%; a normalized internal haze $\leq$ 1.0%/mil; a haze <20%, or <12%; or <8.8%.

In one embodiment, there is provided a film comprising a polyethylene composition, the film having a haze <8.8%; a clarity $\geq$ about 60%; the polyethylene composition having: $0.5 \leq g'_{avg} \leq 0.9$ and an $MFR > (49.011 \times MI^{(-04304)})$. Such a film may have one of both of the following features: an $M_w/M_n \leq 4.6$; and an $MFR > (57.18 \times MI^{(-0.4300)})$.

In another aspect, there is provided a film comprising a low density polyethylene composition, the film having: an area Retromat shrinkage >60%; an MD plastic tension < about 0.08 MPa; a haze <20%; and a clarity $\geq$ 60%.

In another aspect, there is provided a gas phase process for polymerizing olefin(s) to produce the polymer composition described herein comprising contacting the olefin(s), under polymerization conditions, with a catalyst system comprising an achiral cyclic bridged metallocene catalyst compound and an activator. The catalyst compound may comprise $(C_4H_8)Si(C_5Me_4)(C_5H_4)ZrMe_2$. The support may comprise silica. The activator may comprise alumoxane, a modified alumoxane, or a mixture thereof. The activator may comprise methylaluminoxane (MAO), modified methylaluminoxane (MMAO), or a combination thereof. The activator may comprise methylaluminoxane (MAO). The activator may comprise methylaluminoxane (MAO) and the support may comprise silica. The catalyst system may be formed by first combining the MAO and the silica, and then by adding thereto the $(C_4H_8)Si(C_5Me_4)(C_5H_4)ZrMe_2$. The process may be a continuous gas phase process. The comonomer/monomer ratio for example, hexene/ethylene, ratio by mol % used in the process may be <0.007.

A composition as described herein may be used, alone or in a blend, in a monolayer or multilayer structure, in one of the following applications, by way of example: shrink sleeve, label application, shrink-wrap, shrink bundling, green house, heavy duty bag, food packaging, injection molding, blow molding, and sheeting.

Other aspects and features of the present invention will become apparent to those ordinarily skilled in the art upon review of the following description of specific embodiments of the invention.

BRIEF DESCRIPTION OF THE DRAWINGS

Embodiments of the present invention will now be described, by way of example only, with reference to the attached Figures, wherein.

DETAILED DESCRIPTION

Figure 1:
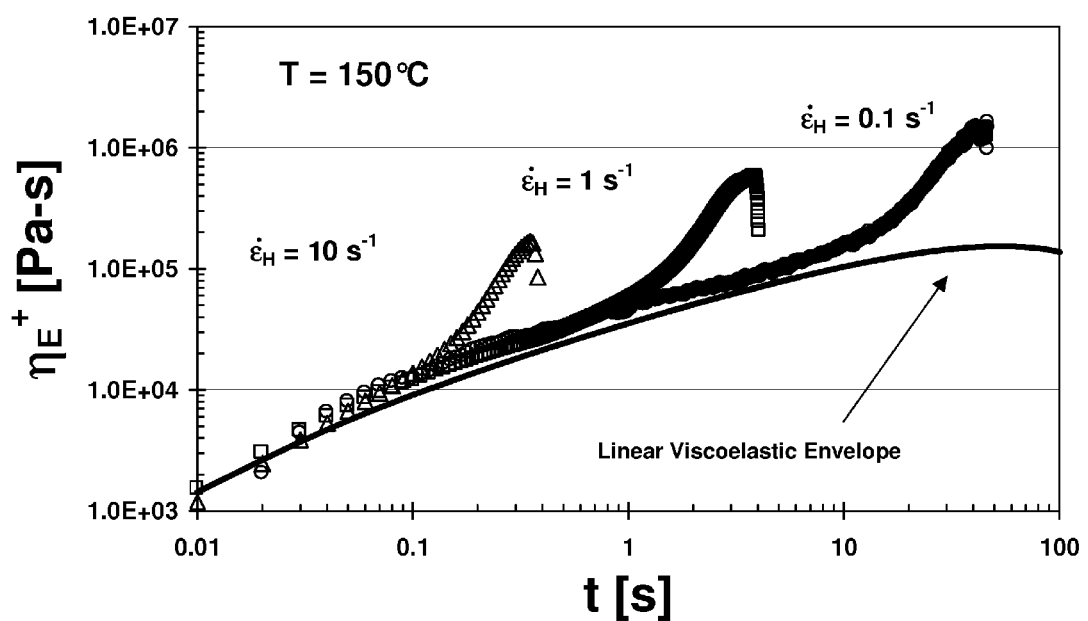
FIGS. 1 and 2 contain graphs of strain hardening of an HP-LDPE ExxonMobil LD103.09 polymer made using $Me_2Si(H_4In)_2ZrCl_2$ as the catalyst; and a polymer made using $(C_4H_8)Si(C_5Me_4)(C_5H_4)ZrMe_2$ as the catalyst, respectively.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an," and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC).

Metallocene Catalyst Compounds

Generally, metallocene-type or metallocene catalyst compounds include half and full sandwich compounds having one or more bonded to at least one metal atom. Typical metallocene compounds are generally described as containing one or more ligand(s) and one or more leaving group(s) bonded to at least one metal atom. In one preferred embodiment, at least one is η-bonded to a metal atom, most preferably $\eta^5$-bonded to the metal atom.

The ligands are generally represented by one or more open, acyclic, or fused ring(s) or ring system(s) or a combination thereof. These, preferably ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, boron, aluminum, and hydrogen, or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 12 and the lanthanide or actinide series of the Periodic Table of Elements. Preferably the metal is a transition metal from Groups 4 through 12, more preferably 4, 5 and 6, and most preferably the metal is from Group 4.

In one embodiment, the metallocene catalyst compounds of the invention are represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The, $L^A$ and $L^B$, are open, acyclic, or fused ring(s) or ring system(s) such as unsubstituted or substituted, cyclopentadienyl ligands or cyclopentadieny I-type ligands, heteroatom substituted and/or heteroatom containing cyclopentadienyl-type ligands. Non-limiting examples of include cyclopentadienyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $\eta^3$-bonding to M, and most preferably $\eta^5$-bonding to M. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ ligands include but are not limited to amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkylcarbamoyl radicals, acyloxy radicals, acylamino radicals, aroylamino radicals, straight, branched or cyclic alkylene radicals, or combination thereof. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a metallocene catalyst compound to form a metallocene catalyst cation capable of polymerizing one or more olefin(s). In one embodiment, Q is a monoamine labile ligand having a sigma-bond to M. Depending on the oxidation state of the metal, the value for n is 0, 1 or 2 such that formula (I) above represents a neutral metallocene catalyst compound. Non-limiting examples of Q ligands include weak bases such as amines, phosphine, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

The bridged metallocene catalyst compounds of embodiments of the invention include those of formula (I) where $L^A$ and $L^B$ are bridged to each other by a cyclic bridging group, A. For the purposes of this patent application and appended claims, the cyclic bridging group A comprises, in addition to hydrogen, greater than 3 non-hydrogen atoms, preferably greater than 3 carbon atoms forming a ring or ring system about at least one other Group 13 to 16 atom. Non-limiting examples of Group 13 to 16 atoms include at least one of a carbon, oxygen, nitrogen, silicon, boron, germanium and tin atom or a combination thereof. In a preferred embodiment, the cyclic bridging group A contains a carbon, silicon or germanium atom, most preferably A contains at least one silicon atom. The atoms forming the ring system of A may be substituted with substituents as defined above for R.

Non-limiting examples of cyclic bridging groups A include cyclo-tri or tetra-alkylene silyl or include cyclo-tri or tetra-alkylene germyl groups, for example, cyclotrimethylenesilyl group or cyclotetramethylenesilyl group.

Other examples of cyclic bridging groups are represented by the following structures:

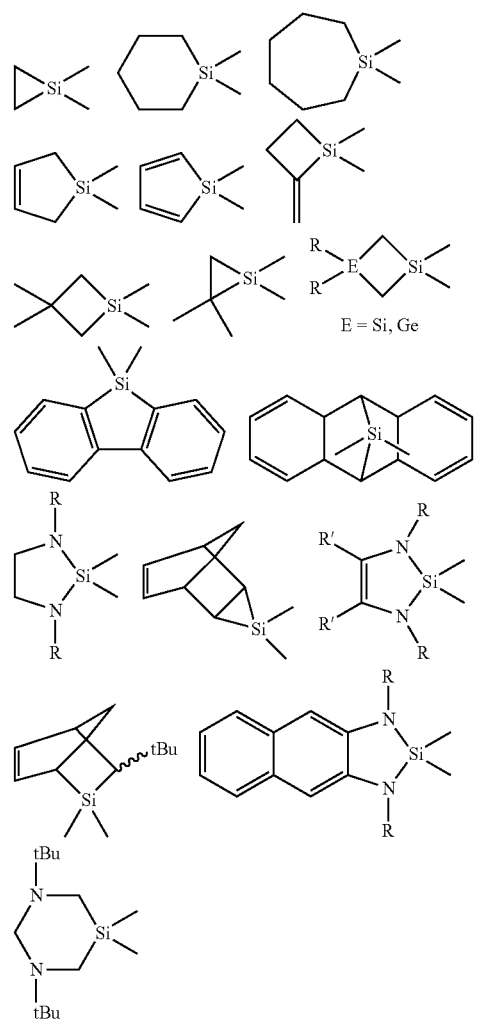

In a preferred embodiment, the metallocene catalyst compounds of the invention include cyclotrimethylenesilyl(tetramethyl cyclopentadienyl)(cyclopentadienyl)zirconium dichloride, cyclotetramethylenesilyl(tetramethyl cyclopentadienyl)(cyclopentadienyl)zirconium dichloride, cyclotrimethylenesilyl (tetramethyl cyclopentadienyl)(2-methyl indenyl)zirconium dichloride, cyclotrimethylenesilyl (tetramethyl cyclopentadienyl)(3-methyl cyclopentadienyl)

zirconium dichloride, cyclotrimethylenesilyl bis(2-methyl indenyl)zirconium dichloride, cyclotrimethylenesilyl(tetramethyl cyclopentadienyl)(2,3,5-trimethyl cyclopentadienyl)zirconium dichloride, and cyclotrimethylenesilyl bis (tetra methyl cyclopentadienyl)zirconium dichloride. In the most preferred embodiment, the metallocene catalyst compound is cyclotetramethy lenesily(tetramethyl cyclopentadienyl)(cyclopentadienyl)zirconium dimethyl.

In another embodiment, the metallocene catalyst compound of the invention is represented by the formula:

$$(C_5H_{4-d}R_d)(R'A_xR')(C_5H_{4-d}R_d)MQg_2 \quad (II)$$

where M is a Group 4, 5, 6 transition metal, $(C_5H_4\text{-d }R_d)$ is an unsubstituted or substituted, cyclopentadienyl ligand or cyclopentadienyl-type ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, $R'A_xR'$ is a cyclic bridging group, where A is one or more of, or a combination of carbon, germanium, silicon, tin, phosphorous or bridging two $(C_5H_4\text{-d }R_d)$ rings, and the two R''s form a cyclic ring or ring system with A; more particularly, non-limiting examples of cyclic bridging group A may be represented by $R'_2C,R'_2Si,R'_2Ge,R'P$, and $R'B(E)$, where E is a Lewis base such as phosphine or amine, where the two R''s are joined to form a ring or ring system. In one embodiment, R' is a hydrocarbyl containing a heteroatom, for example boron, nitrogen, oxygen or a combination thereof The two R''s may be independently, hydrocarbyl, substituted hydrocarbyl, halocarbyl, substituted halocarbyl, hydrocarbyl-substituted organometalloid, halocarbyl-substituted organometalloid, where the two R''s may be joined to form a ring or ring system having from 2 to 100 non-hydrogen atoms, preferably from 3 to 50 carbon atoms; and independently, each Q can be the same or different is a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof, also, two Q's together may form an alkylidene ligand or cyclometallated hydrocarbyl ligand or other divalent anionic chelating ligand, where g is an integer corresponding to the formal oxidation state of M, and d is an integer selected from 0, 1, 2, 3 or 4 and denoting the degree of substitution, x is an integer from 1 to 4.

In one embodiment, the cyclic bridged metallocene catalyst compounds are those where the R substituents on the ligands $L^A$ and $L^B$, $(C_5H_{4-d}R_d)$ of formulas (I) and (II) are substituted with the same or different number of substituents on each of the ligands. In another embodiment, the ligands $L^A$ and $L^B$, $(C_5H_{4-d}R_d)$ of formulas (I) and (II) are different from each other.

In a preferred embodiment, the ligands of the metallocene catalyst compounds of formula (I) and (II) are asymmetrically substituted. In another preferred embodiment, at least one of the ligands $L^A$ and $L^B$, $(C_5H_{4-d}R_d)$ of formulas (I) and (II) is unsubstituted.

In a preferred embodiment, the ligands of the cyclic bridged metallocene catalyst compounds of the invention are achiral.

Other metallocene catalysts compounds useful in the invention include cyclic bridged heteroatom, mono-ligand metallocene-type compounds. These types of catalysts and catalyst systems are described in, for example, WO 92/00333, WO 94/07928, WO 91/04257, WO 94/03506, W096/00244 and WO 97/15602, U.S. Pat. Nos. 5,057,475, 5,096,867, 5,055,438, 5,198,401, 5,227,440 and 5,264,405, and EP-A-0 420 436. Other metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398 and 5,753,578, WO 93/08221, WO 93/08199, WO 95/07140, WO 98/11144, and EP-A-0 578 838, EP-A-0 638 595, EP-B-0 513 380, EP-A1-0 816 372, EP-A2-0 839 834 and EP-B1-0 632 819.

In another embodiment, the cyclic bridged metallocene catalyst compound is represented by the formula:

$$L^CAJMQ_n \quad (III)$$

where M is a Group 3 to 10 metal atom or a metal selected from the Group of actinides and lanthanides of the Periodic Table of Elements, preferably M is a Group 4 to 10 transition metal, and more preferably M is a Group 4, 5 or 6 transition metal, and most preferably M is a Group 4 transition metal in any oxidation state, especially titanium; $L^C$ is a substituted or unsubstituted ligand bonded to M; J is bonded to M; A is bonded to L and J; J is a heteroatom ancillary ligand; and A is a cyclic bridging group; Q is a univalent anionic ligand; and n is the integer 0, 1 or 2. In formula (III) above, $L^C$, A and J form a fused ring system. In an embodiment, $L^C$ of formula (III) is as defined above for $L^A$ in formula (I), and A, M and Q of formula (III) are as defined above in formula (I).

In another embodiment of this invention the metallocene catalyst compound useful in the invention is represented by the formula:

$$(C_5H_{5-y-x}R_x)(R''A_yR'')(JR'_{z-1-y})M(Q)_n(L')_w \quad (IV)$$

where M is a transition metal from Group 4 in any oxidation state, preferably, titanium, zirconium or hafnium, most preferably titanium in either a +2, +3 or +4 oxidation state. A combination of compounds represented by formula (IV) with the transition metal in different oxidation states is also contemplated. $L^C$ is represented by $(C_5H_{5-y-x}R_x)$ and is a ligand as described above. For purposes of formula (IV) $R_O$ means no substituent. More particularly $(C_5H_{5-y-x}R_x)$ is a cyclopentadienyl ring or cyclopentadienyl-type ring or ring system which is substituted with from 0 to 4 substituent groups R, and "x" is 0, 1, 2, 3 or 4 denoting the degree of substitution. Each R is, independently, a radical selected from a group consisting of 1 to 30 non-hydrogen atoms. More particularly, R is a hydrocarbyl radical or a substituted hydrocarbyl radical having from 1 to 30 carbon atoms, or a hydrocarbyl-substituted metalloid radical where the metalloid is a Group 14 or 15 element, preferably silicon or nitrogen or a combination thereof, and halogen radicals and mixtures thereof. Substituent R groups also include silyl, germyl, amine, and hydrocarbyloxy groups and mixtures thereof. Also, in another embodiment, $(C_5H_{5-y-x}R_x)$ is a cyclopentadienyl ligand in which two R groups, preferably two adjacent R groups are joined to form a ring or ring system having from 3 to 50 atoms, preferably from 3 to 30 carbon atoms. This ring system may form a saturated or unsaturated polycyclic cyclopentadienyl-type ligand such as those ligands described above, for example, indenyl, tetrahydroindenyl, fluorenyl or octahydrofluorenyl.

The $(JR'_{z-1-y})$ of formula (IV) is a heteroatom containing ligand in which J is an element with a coordination number of three from Group 15 or an element with a coordination number of two from Group 16 of the Periodic Table of Elements. Preferably, J is a nitrogen, phosphorus, oxygen or sulfur atom with nitrogen being most preferred. Each R' is, independently, a radical selected from the group consisting of hydrocarbyl radicals having from 1 to 20 carbon atoms, or as defined for R in formula (I) above; the "y" is 1 to 4, preferably 1 to 2, most preferably y is 1, and the "z" is the coordination number of the element J. In one embodiment, in formula (IV), the J of formula (III) is represented by $(JR'_{z-1-y})$.

In formula (IV) each Q is, independently, any univalent anionic ligand such as halogen, hydride, or substituted or unsubstituted hydrocarbyl having from 1 to 30 carbon atoms, alkoxide, aryloxide, sulfide, silyl, amide or phosphide. Q may also include hydrocarbyl groups having ethylenic or aromatic unsaturation thereby forming a $\eta^3$bond to M. Also, two Q's may be an alkylidene, a cyclometallated hydrocarbyl or any other divalent anionic chelating ligand. The integer n may be 0, 1, 2 or 3.

The (R"A$_y$R") of formula (IV) is a cyclic bridging group where A is a Group 13 to 16 element, preferably a Group 14 and 15 element, most preferably a Group 14 element. Non-limiting examples of A include one or more of, or a combination of carbon, silicon, germanium, boron, nitrogen, phosphorous, preferably at least one silicon atom. The two R"'s for a ring or ring system about A, the two R"'s together having from 3 to 100 non-hydrogen atoms, preferably from 3 to 50 carbon atom.

Optionally associated with formula (IV) is L', a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q and n is 0, 1, 2 or 3.

Activator and Activation Methods for the Metallocene Catalyst Compounds

The above described cyclic bridged metallocene catalyst compounds are can be activated with an activator comprising an aluminoxane or the product of an aluminoxane and a support or carrier. This activation yields catalyst compounds capable of polymerizing olefins.

It is well known in the art that aluminoxanes contain a broad distribution of structures formed from the reaction of R"3Al or mixtures of R"3Al, where R" is hydrogen or a similar or different hydrocarbyl, with water. This is in contrast with dialuminoxanes which have a specific structure. It is also well recognized that aluminoxanes may contain alanes, R"3Al, remaining from an incomplete hydrolysis reaction.

The above described cyclic bridged metallocene catalyst compounds are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the metallocene catalyst compounds of the invention as described above. Non-limiting activators, for example may include a Lewis acid or a non-coordinating ionic activator or ionizing activator or any other compound including Lewis bases, aluminum alkyls, conventional-type cocatalysts or an activator-support and combinations thereof that can convert a neutral metallocene catalyst compound to a catalytically active metallocene cation. It is within the scope of this invention to use alumoxane or modified alumoxane as an activator, and/or to also use ionizing activators, neutral or ionic, such as tri(n-butyl)ammonium tetrakis(pentafluorophenyl)boron or a trisperfluorophenyl boron metalloid precursor or a trisperfluoronaphtyl boron metalloid precursor that would ionize the neutral metallocene catalyst compound.

In one embodiment, an activation method using ionizing ionic compounds not containing an active proton but capable of producing both a metallocene catalyst cation and a non-coordinating anion are also contemplated, and are described in EP-A-0 426 637, EP-A-0 573 403 and U.S. Pat. No. 5,387, 568.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656, EP-A-0 561 476, EP-B1-0 279 586 and EP-A-0 594-218, and WO 94/10180.

Ionizing compounds may contain an active proton, or some other cation associated with but not coordinated to or only loosely coordinated to the remaining ion of the ionizing compound. Such compounds and the like are described in EP-A-0 570 982, EP-A-0 520 732, EP-A-0 495 375, EP-A-500 944, EP-A-0 277 003 and EP-A-0 277 004, U.S. Pat. Nos. 5,153, 157, 5,198,401, 5,066,741, 5,206,197, 5,241,025, 5,384,299 and 5,502,124, and U.S. patent application Ser. No. 08/285, 380, filed Aug. 3, 1994.

Other activators include those described in WO 98/07515 such as tris (2, 2',2"-nonafluorobiphenyl)fluoroaluminate, which publication is fully incorporated herein by reference. Combinations of activators are also contemplated by the invention, for example, alumoxanes and ionizing activators in combinations, see for example, WO 94/07928 and WO 95/14044, and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate). 4THF as an activator for a metallocene catalyst compound. Also, methods of activation such as using radiation (see EP-B1-0 615 981), electro-chemical oxidation, and the like are also contemplated as activating methods for the purposes of rendering the neutral metallocene catalyst compound or precursor to a metallocene-type cation capable of polymerizing olefins.

It is further contemplated by the invention that other catalysts can be combined with the cyclic bridged metallocene catalyst compounds of the invention. For example, see U.S. Pat. Nos. 4,937,299, 4,935,474, 5,281,679, 5,359,015, 5,470, 811, and 5,719,241.

In another embodiment of the invention one or more metallocene catalyst compounds or catalyst systems may be used in combination with one or more conventional-type or other advanced catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031, and WO 96/23010.

Method for Supporting

The above described cyclic metallocene catalyst compounds and catalyst systems may be combined with one or more support materials or carriers using one of the support methods well known in the art or as described below. In the preferred embodiment, the method of the invention uses a polymerization catalyst in a supported form. For example, in a most preferred embodiment, a metallocene catalyst compound or catalyst system is in a supported form, for example deposited on, bonded to, contacted with, or incorporated within, adsorbed or absorbed in, or on, a support or carrier.

The terms "support" or "carrier" are used interchangeably and are any support material, preferably a porous support material, for example, talc, inorganic oxides and inorganic chlorides. Other carriers include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-B1 0 511 665) and the like. Also, combinations of these support materials may be used, for example, silica-chromium, silica-alumina, silica-titania and the like.

It is preferred that the carrier, most preferably an inorganic oxide, has a surface area in the range of from about 10 to about 700 $m^2/g$, pore volume in the range of from about 0.1 to about 4.0 cc/g and average particle size in the range of from about 5 to about 500 µm. More preferably, the surface area of the carrier is in the range of from about 50 to about 500 $m^2/g$, pore volume of from about 0.5 to about 3.5 cc/g and average particle size of from about 10 to about 200 µm. Most preferably the surface area of the carrier is in the range is from about 100 to about 400 $m^2/g$, pore volume from about 0.8 to about 3.0 cc/g and average particle size is from about 5 to about 100 µm. The average pore size of the carrier of the invention typically has pore size in the range of from 10 to 1000 Å, preferably 50 to about 500 Å, and most preferably 75 to about 350 Å.

Examples of supporting the metallocene catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664, U.S. application Ser. No. 08/271,598 filed Jul. 7, 1994 and Ser. No. 08/788,736 filed Jan. 23, 1997, and WO 95/32995, WO 95/14044, WO 96/06187 and WO 97/02297.

In one embodiment, the cyclic bridged metallocene catalyst compounds of the invention may be deposited on the same or separate supports together with an activator, or the activator may be used in an unsupported form, or may be deposited on a support different from the supported metallocene catalyst compounds of the invention, or any combination thereof.

There are various other methods in the art for supporting a polymerization catalyst compound or catalyst system of the invention. For example, the cyclic bridged metallocene catalyst compound of the invention may contain a polymer bound ligand as described in U.S. Pat. Nos. 5,473,202 and 5,770,755, the metallocene catalyst system of the invention may be spray dried as described in U.S. Pat. No. 5,648,310, the support used with the cyclic bridged metallocene catalyst system of the invention is functionalized as described in EP-A-0 802 203, or at least one substituent or leaving group is selected as described in U.S. Pat. No. 5,688,880.

In a preferred embodiment, the invention provides for a supported cyclic bridged metallocene catalyst system that includes an antistatic agent or surface modifier that is used in the preparation of the supported catalyst system as described in WO 96/11960. The catalyst systems of the invention can be prepared in the presence of an olefin, for example hexene-1.

A preferred method for producing the supported cyclic bridged metallocene catalyst system of the invention is described below and is described in WO 96/00245 and WO 96/00243. In this preferred method, the cyclic bridged metallocene catalyst compound is slurried in a liquid to form a metallocene solution and a separate solution is formed containing an activator and a liquid. The liquid may be any compatible solvent or other liquid capable of forming a solution or the like with the cyclic bridged metallocene catalyst compounds and/or activator of the invention. In the most preferred embodiment the liquid is a cyclic aliphatic or aromatic hydrocarbon, most preferably toluene. The cyclic bridged metallocene catalyst compound and activator solutions are mixed together and added to a porous support or the porous support is added to the solutions such that the total volume of the metallocene catalyst compound solution and the activator solution or the metallocene catalyst compound and activator solution is less than four times the pore volume of the porous support, more preferably less than three times, even more preferably less than two times; preferred ranges being from 1.1 times to 3.5 times range and most preferably in the 1.2 to 3 times range. Another preferred method is to pre-react the porous support with an activator in a hydrocarbon diluent. The hydrocarbon solution of the cyclic bridged metallocene is added later to complete the catalyst preparation.

Procedures for measuring the total pore volume of a porous support are well known in the art. Details of one of these procedures are discussed in Volume 1, Experimental Methods in Catalytic Research (Academic Press, 1968) (specifically see pages 67-96). This preferred procedure involves the use of a classical BET apparatus for nitrogen absorption. Another method well known in the art is described in Innes, Total Porosity and Particle Density of Fluid Catalysts By Liquid Titration, Vol. 28, No. 3, Analytical Chemistry 332-334 (March, 1956).

The mole ratio of the metal of the activator component to the metal of the supported cyclic bridged metallocene catalyst compounds are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the cyclic bridged metallocene catalyst is preferably in the range of between 0.3:1 to 3:1. Where an unsupported cyclic bridged metallocene catalyst system is utilized, the mole ratio of the metal of the activator component to the metal of the cyclic bridged metallocene catalyst compound is in the range of between 0.3:1 to 10,000:1, preferably 100:1 to 5000:1, and most preferably 500:1 to 2000:1.

In a preferred embodiment, the catalyst system comprises a catalyst as described herein activated by methylaluminoxane (MAO) and supported by silica. While conventionally, MAO is combined with a metallocene and then the combination is deposited on silica, as shown in the examples, the preference herein is to first combine the activator (e.g. MAO) and the support (e.g. silica) and then to add the catalyst to the combination. Modified MAO (MMAO) or a combination of MAO and MMAO may also be used. In a preferred embodiment, the catalyst compound comprises $(C_4H_8)Si(C_5Me_4)(C_5H_4)ZrMe_2$.

In one embodiment of the invention, olefin(s), preferably $C_2$ to $C_{30}$ olefin(s) or alpha-olefin(s), preferably ethylene or propylene or combinations thereof are prepolymerized in the presence of the cyclic bridged metallocene catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578, EP-B-0279 863, and WO 97/44371.

In one embodiment the polymerization catalyst is used in an unsupported form, preferably in a liquid form such as described in U.S. Pat. Nos. 5,317,036 and 5,693,727, and EP-A-0 593 083. The polymerization catalyst in liquid form can be fed to a reactor as described in WO 97/46599.

In one embodiment, the cyclic bridged metallocene catalysts of the invention can be combined with a carboxylic acid salt of a metal ester, for example aluminum carboxylates such as aluminum mono, di- and tri-stearates, aluminum octoates, oleates and cyclohexylbutyrates, as described in U.S. Pat. No. 6,300,436.

Polymerization Process

The catalysts and catalyst systems of the invention described above are suitable for use in any polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In a preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In the most preferred embodiment, a copolymer of ethylene and butene is produced.

In another embodiment of the process of the invention, ethylene or propylene is polymerized with at least two different comonomers, optionally one of which may be a diene, to form a terpolymer. In one embodiment, two of the three monomers of the terpolymer are butene and ethylene. In one embodiment, the comonomer content is 1.0 to 20.0 wt %, or 2.0 to 15.0 wt %. As seen in example 5 below, the use of $(C_4H_8)Si(C_5Me_4)(C_5H_4)ZrMe_2$ as the catalyst in preparing an ethylene/butene copolymer, resulted in a sharp response to comonomer ratio. That is, the melt index (MI) changed quickly and sharply as the comonomer ratio was adjusted. Density changes were also observed. These changes may be associated with long chain branching. Therefore, polymers having ethylene and butene as two of the monomers may be used to control product melt index. Further, products with broad or bimodal distribution in molecular weight or melt index in a single reactor using a single catalyst could be used by changing the comonomer feed in a controlled fashion, thus producing polyethylene products with custom designed properties with single reactor economics.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged metallocene catalysts as described in U.S. Pat. Nos. 5,296,434 and 5,278,264.

Typically in a gas phase polymerization process, a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to about 110° C., and most preferably in the range of from about 70° C. to about 95° C.

Typical polymerization conditions are set forth in Table 1.

TABLE 1

| Typical Polymerization Conditions | |
| --- | --- |
| Condition | Value |
| Reaction Temperature | 70° C. |
| Ethylene partial pressure | 170 psi |
| $H_2$ Conc | ~2000 ppm |
| $H_2/C_2$ | 0.004 |
| $C_4/C_2$ | 0.043 |
| Other Additive | 20-30 ppmw |

Other gas phase processes contemplated by the process of the invention include those described in U.S. Pat. Nos. 5,627,242, 5,665,818 and 5,677,375, and EP-A-0 794 200, EP-A-0 802 202 and EP-B-634 421.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555.

A preferred process of the invention is where the process, preferably a slurry or gas phase process is operated in the presence of a metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in WO 96/08520 and U.S. Pat. Nos. 5,712,352 and 5,763,543. In another preferred embodiment of the process of the invention, the process is operated by introducing a benzyl compound into the reactor and/or contacting a benzyl compound with the metallocene catalyst system of the invention prior to its introduction into the reactor.

Polymer Product of Embodiments of Invention

The properties of the polymers were determined by the test methods listed in Table 2 or described herein.

TABLE 2

Test Methods

| Property | Units | Procedure |
|---|---|---|
| Melt Indices, Melt Flow Ratios | dg/min | ASTM D-1238 |
| Density | g/cc | ASTM D-1505 |
| Haze | % | ASTM D-1003 |
| Gloss @ 45° | % | ASTM D-2457 |
| Tensile @ Yield | mPa | ASTM D-882 |
| Elongation @ Yield | % | ASTM D-882 |
| 1% Secant Modulus | mPa | ASTM D-882 |
| Dart Drop Impact | g/μm | ASTM D-1709 (A) |
| Elmendorf Tear Resistance | g/μm | ASTM D-1922 |
| Melt Strength | cN | As described in Specification |

Long chain branching index (LCB or $g'_{avg}$) and g' are described in U.S. Pat. No. 6,870,010.

Polymers of the instant invention may have enhanced optical and shrinkage properties, as discussed further below.

The polymers produced by a process of an embodiment of the invention can be used in a wide variety of products and end-use applications. The polymers produced include linear low-density polyethylene, plastomers, high-density polyethylenes, low-density polyethylenes, polypropylene and polypropylene copolymers. The polymers may be made up of, at least partially, butene, ethylene, and other olefin monomers having from 2 to 20 carbon atoms. For instance, the polymers may be copolymers of butene and ethylene, or terpolymers of butene, ethylene, and other olefin monomer.

The polymers, typically ethylene based polymers, have a density in the range of from 0.90 g/cc to 0.97 g/cc, preferably in the range of from 0.90 g/cc to 0.965 g/cc, more preferably in the range of from 0.90 g/cc to 0.96 g/cc, even more preferably in the range of from 0.905 g/cc to 0.95 g/cc, yet even more preferably in the range from 0.910 g/cc to 0.945 g/cc, and most preferably greater than 0.915 g/cc to about 0.935 g/cc. The melt strength of the polymers produced using the catalyst of the invention are preferably greater than 4 cN, preferably greater than 5 cN and, preferably less than 10 cN. For purposes of this patent application and appended claims melt strength is measured with a capillary rheometer (RHEO-TESTER∩ 1000, Goettfert, Rock Hill, S.C.) in conjunction with the Goettfert Rheotens melt strength apparatus (RHEO-TENS™ 71.97). A polymer melt strand extruded from the capillary die is gripped between two counter-rotating wheels on the apparatus. The take-up speed is increased at a constant acceleration of 12 mm/sec$^2$, which is controlled by the Win-RHEO™ program provided by Goettfert. The maximum pulling force (in the unit of cN) achieved before the strand breaks or starts to show draw-resonance is determined as the melt strength. The temperature of the rheometer is set at 190° C. The barrel has a diameter of 12 mm. The capillary die has a length of 30 mm and a diameter of 2 mm. The polymer melt is extruded from the die at a piston speed of 0.49 mm/sec. The apparent shear rate for the melt in the die is, therefore, 70 sec$^{-1}$ and the speed at die exit is 17.5 mm/sec. The distance between the die exit and the wheel contact point should be 125 mm. Polymers of embodiments of the instant invention have a combination of exceptionally high shear thinning for extrusion, outstanding film optical property and excellent shrink performance. Historically HD-LDPE is the only product family having most of these attributes. However, the clarity of HP-LDPE is far inferior to polymers of embodiments of the instant invention. Conventional ZN-LLDPE are lacking of most of these attributes. Some easy process (i.e., very broad MWD) products from gas phase and/or slurry processes, are typically very poor in optical properties. The shrink property of these conventional products is also somewhat insufficient for shrink application. $(C_4H_8)Si(C_5Me_4)$ $(C_5H_4)ZrMe_2$ was found to be very effective in reducing the film haze of various LLDPE (especially for a polymer made using $(1,3\text{-Me}, n\text{-Bu-Cp})_2ZrCl_2$ as the catalyst and for a polymer made using $(C_5H_4\text{-CH}_2CH_2CH_3)_2Hf(CH_3)_2$.

Figure 2:
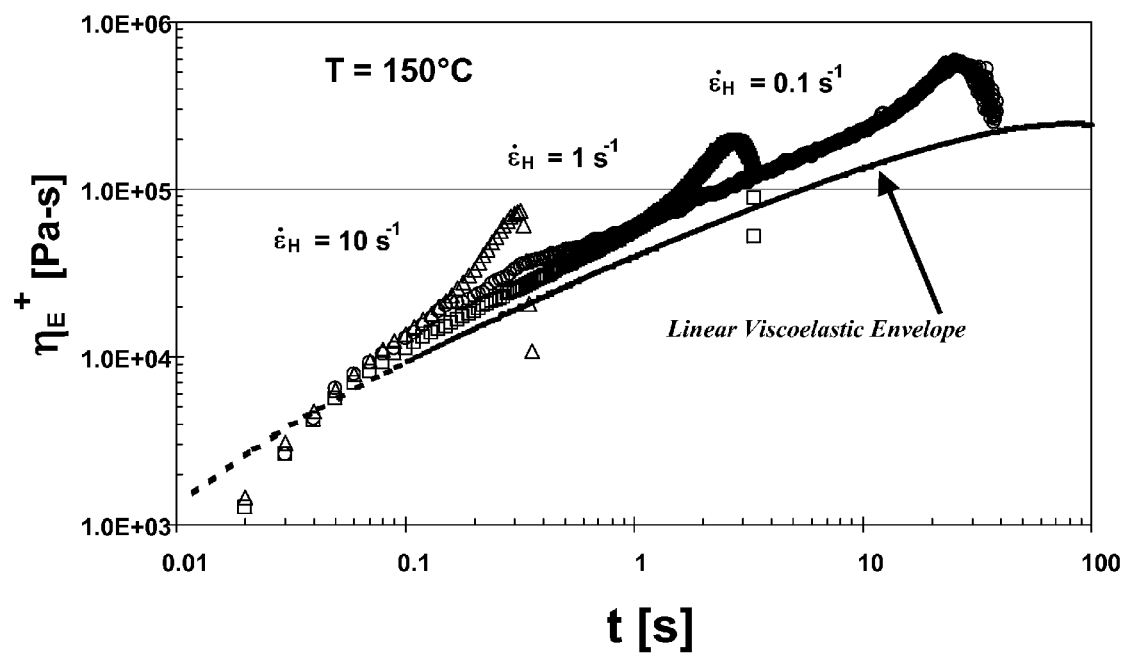

As shown in FIG. 2, polymers of embodiments of the instant invention exhibited strain-hardening behavior under the transient uniaxial extensional flow, similar to HP-LDPE. As shown in Table 5, polymers of embodiments of the instant invention have broad MFR (over 100), which is an indicator of good processability. The films from these products have TD shrinkage comparable to or better than HP-LDPE, optical properties similar to HP-LDPE and dart impact strength significantly better than HP-LDPE and LLDPE. Compared with a high-pressure ethylene polymerization process, a gas phase reactor also has the added benefit of lower cost and, in general, higher capacity.

The strain hardening at 150° C. of Comparative Example A (ExxonMobil LD103.09, from Exxon Mobil Chemical Company, Houston, Tex.) and Example 5 are respectively shown in FIGS. 1 and 2. The following two references discuss strain hardening of polyolefins and the test for measuring the same: "Strain hardening of various polyolefins in uniaxial elongational flow", The Society of Rheology, Inc. J. Rheol. 47(3), 619-630 (2003); and "Measuring the transient extensional rheology of polyethylene melts using the SER universal testing platform", The Society of Rheology, Inc. J. Rheol. 49(3), 585-606 (2005).

RETRAMAT Shrink Test

The RETRAMAT shrink test used herein is based on NFT 54-125 and ASTM D 2838-95, procedure A. Methods DIN 53-369 and ISO/DIS 14616 only cover the shrink force measurement, but do not give guidelines on the simultaneous measurement of shrink percentages. The ASTM method covers the determination of the plastic shrink tension and related shrink characteristics shrink force and orientation release stress of heat-shrinkable film of less than 800 μm thickness, while the specimen is totally restrained from shrinking as it is heated. The NFT 54-125 method covers the total shrinking process, being both the plastic and the thermal shrink process.

The method used herein consists of exposing two film samples to a given temperature, during a given time, and to cool them down at room temperature, simulating what happens inside a shrinkage installation. For each test sample, a minimum of 10 strips off 150 mm length and 15 mm width are prepared for both MD and TD on a sample cutter. Retramat stickers are applied onto the sample edges so that the shrink area of the test specimen measures exactly 100 mm in length. The oven temperature is 190° C. and the closing duration is 45 seconds. During the test, one of the samples is connected to a force transducer, while the other is connected to a displacement transducer. A thermocouple allows following up the temperature at a few millimetres from the middle of the sample. The 3 parameters (force—displacement—temperature) are continuously displayed on the Retramat and recorded on a lab PC.

The polymers produced by the process of the invention may have a molecular weight distribution, a weight average molecular weight to number average molecular weight ($M_w/M_n$) of greater than 1.5 to about 15, particularly greater than 2 to about 10, more preferably greater than about 2.5 to less than about 8, and most preferably from 3.0 to 8.

In one preferred embodiment, the polymers of the present invention have a $M_z/M_w$, of greater than or equal to 3, preferably greater than 3. $M_z$ is the z-average molecular weight. In another preferred embodiment, the polymers of the invention have a $M_z/M_w$ of greater than or equal to 3.0 to about 4. In yet another preferred embodiment, the $M_z/M_w$, is in the range greater than 3 to less than 4.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.01 dg/min to about 50 dg/min, even more preferably from about 0.01 dg/min to about 10 dg/min, and most preferably from about 0.05 dg/min to about 10 dg/min.

Figure 3:
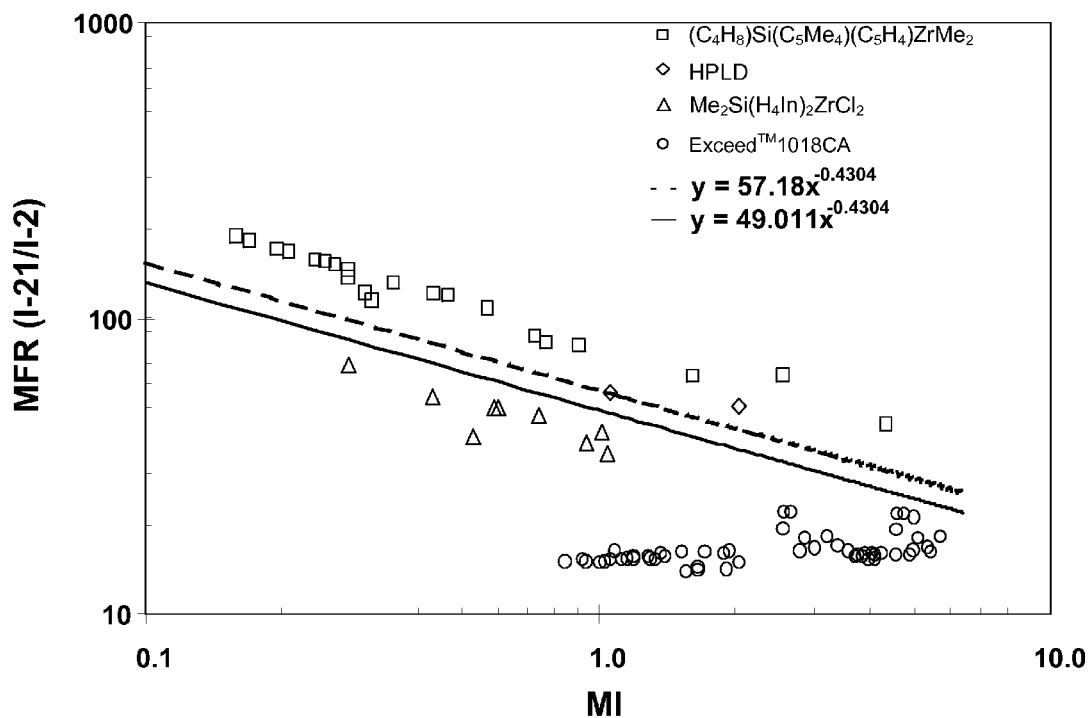
FIG. 3 is a graph of MFR v. MI for polymers of embodiments of the instant invention and comparative polymers.

The polymers of the invention in an embodiment have a melt index ratio ($I_{21}/I_2$) ($I_2$ is measured by ASTM-D-1238-F) equal to or greater than $49.011 \times MI^{(-0.4304)}$; more preferably equal to or greater than $57.18 \times MI^{(-0.4304)}$; as shown in FIG. 3.

In certain embodiments, the polymers as described herein may have a narrow composition distribution characterized in that the T75–T25 value is lower than 25, preferably lower than 20, more preferably lower than 15, and most preferably lower than 10, wherein T25 is the temperature at which 25% of the eluted polymer is obtained and T75 is the temperature at which 75% of the eluted polymer is obtained in a TREF experiment as described herein. The TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto the column and cooled from 140° C. to 25° C. at a constant cooling rate of 1.0° C./min. Subsequently, ODCB was pumped through the column at a flow rate of 1.0 ml/min, and the column temperature was increased at a constant heating rate of 2° C./min to elute the polymer.

As shown below in Table 3, films of embodiments of the invention possess good optical and shrinkage properties. For instance, the films may have one or more of the following properties: an MD plastic shrink tension≦about 0.08 MPa; an area Retromat shrinkage>60%; a clarity≧60%; a normalized internal haze≦1.0%/mil; a haze<20%; a haze<12%; and a haze<8.8%.

The polymers of the invention may be blended and/or coextruded with any other polymer. Non-limiting examples of other polymers include linear low density polyethylenes produced via conventional Ziegler-Natta and/or metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by monolayer extrusion, coextrusion or by lamination useful as shrink sleeves, shrink wrap, bundle shrink, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

In all the examples below, the methylalumoxane (MAO) used was a 30 weight percent MAO solution in toluene (typically 13.5 wt % Aluminum and 28.2 wt % MAO by NMR) available from Albemarle Corporation (Baton Rouge, La.). Davison 948 silica dehydrated to 600° C. (silica gel) was used and is available from W. R. Grace, Davison Chemical Division (Baltimore, Md.). Anhydrous, oxygen-free solvents were used. The synthesis of $(CH_2)_4Si(C_5Me_4(CH_2)_4Si(C_5Me_4)(C_5H_5)ZrCl_2$ is described in U.S. Pat. No. 6,388,155.

Preparation of $(CH_2)_4Si(C_5Me_4)(C_5H_5)ZrMe_2$

A 1.6 M solution of methyl lithium and ether (184 mL, 0.294 mol) was slowly added to a stirred mixture of $(CH_2)_4Si(C_5Me_4)(C_5H_5)ZrCl_2$ (60 g, 0.139 mol) and ether (600 mL) in a 2 L flask. After stirring for 4 h, the ether was slowly removed with a $N_2$ purge then the remaining solids extracted with methylene chloride. The solvent was removed to give the product (41 g, 0.105 mol).

Preparation of Snowtex™ Blended Aluminum Stearate

A 4 L beaker was charged with Aluminum stearate (200 g) from Crompton Corporation (now Chemtura Corporation, Middlebury, Conn.), a 30 wt % suspension of Snowtex™ IPA-ST-ZL in isopropanol (164 g) from Nissan Chemical Industries Inc. (Houston, Tex.) and methanol (300 mL). The slurry was stirred at ambient for 2 hours then dried to a mud with a nitrogen purge. Vacuum and heat (108° C.) were applied for two days to remove residual solvent. The solids were crushed and sieved through a No. 25 mesh screen to give 20 wt % Snowtex™ flow aid (Nissan Chemical Industries Inc., Houston, Tex.) as a fine powder.

Preparation of Catalyst A

Crosfield ES757 silica (741 g) (INEOS Silicas Limited, Warrington, U.K.), dehydrated at 600° C., was added to a stirred (overhead mechanical conical stirrer) mixture of toluene (2 L) and 30 wt % solution of methyl aluminoxane in toluene (874 g, 4.52 mol). The silica was chased with toluene (200 mL) then the mixture was heated to 90° C. for 3 h. Afterwards, volatiles were removed by application of vacuum and mild heat (40° C.) overnight then the solid was allowed to cool to room temperature. To a stirred slurry of these solids and toluene (3 L), was slowly added a solution of $(CH_2)_4Si(C_5Me_4)(C_5H_5)ZrMe_2$ (16.8 g, 43.0 mmol) and toluene (1 L) over a 3 h period. After an additional 3 h, volatiles were removed by application of vacuum and mild heat (40° C.) overnight then the solid was allowed to cool to room temperature. This catalyst was dry-blended briefly with a mixture of 20 wt % Snowtex™ and 80 wt % aluminum stearate (7.5 wt % total of additive).

Preparation of Catalyst B

Crosfield ES70 silica (741 g), (INEOS Silicas Limited, Warrington, U.K.), dehydrated at 600° C., was added to a stirred (overhead mechanical conical stirrer) mixture of toluene (2 L) and 30 wt % solution of methyl aluminoxane in toluene (874 g, 4.52 mol). The silica was chased with toluene (200 mL) then the mixture was heated to 90° C. for 3 h. Afterwards, volatiles were removed by application of vacuum and mild heat (40° C.) overnight, then the solid was allowed to cool to room temperature. To a stirred slurry of these solids and toluene (3 L), was slowly added a solution of $(CH_2)_4Si(C_5Me_4)(C_5H_5)ZrMe_2$ (16.8 g, 43.0 mmol) and toluene (1 L) over a 3 h period. After an additional 3 h, volatiles were removed by application of vacuum and mild heat (40° C.) overnight then the solid was allowed to cool to room temperature. The solids were dry-blended briefly with 82.48 g of a mixture of 20 wt % SnowTex and 80 wt % aluminum stearate.

Preparation of Methyl Aluminoxane Supported on Silica (SMAO)

In a typical procedure, silica (741 g), dehydrated at 600° C., was added to a stirred (overhead mechanical conical stirrer) mixture of toluene (2 L) and 30 wt % solution of methyl aluminoxane in toluene (874 g, 4.52 mol). The silica was chased with toluene (200 mL) then the mixture was heated to 90° C. for 3 h. Afterwards, volatiles were removed by application of vacuum and mild heat (40° C.) overnight then the solid was allowed to cool to room temperature.

Preparation of Cat C

To a slurry of 4.5 mmol/g methyl aluminoxane supported on Davison 948 silica, dehydrated at 600° C., (40 g) and pentane (300 mL) stirred with an overhead stirrer, was slowly added a solution of $(CH_2)_4Si(C_5Me_4)(C_5H_5)ZrMe_2$ (670 mg, 1.72 mmol) and toluene. After stirring 18 h, the mixture was filtered and dried.

Polymerization with Cat C

These catalysts were tested in a continuous fluidized-bed gas-phase reactor with a nominal 14" reactor diameter, an average bed weight of about 1900 g, gas-velocity of about 1.6 ft/s, production rate of about 500 g/h. The reactor was operated at a pressure of 300 psig of which ethylene was 35 mol %. The balance of gas was made up with hydrogen, 1-hexene, and nitrogen as indicated in Table 3.

TABLE 3

| Polymerization conditions | |
| --- | --- |
| Catalyst | Cat C |
| LGPR ID | 71-2005 |
| $H_2$ conc. (molppm) | 945 |
| Hexene conc. (mol %) | 0.444 |
| Reactor Temp (° C.) | 79 |
| Productivity (g/gh) | 721 |
| Number of Bedturnovers | 9.8 |

Examples 1 and 2

The polymers of Examples 1 and 2 were prepared from ethylene and butene-1 monomers in a pilot-scale continuous gas phase fluidized bed reactor using CAT A. The reactor was operated at 70° C. and 170 psi ethylene partial pressure. The fluidized bed was made up of polymer granules and the average bed weight was approximately 100 to 170 lbs. During the reaction, aluminum distearate was added to the reactor as a 20 wt % slurry in mineral oil at concentrations on a resin basis from 6 and 17 ppmw (parts per million weight). The conditions for making polymers of Examples 1 and 2 are listed in Table 4.

TABLE 4

| Polymerization Conditions of Examples 1 and 2. | | |
| --- | --- | --- |
| Condition | Conditions for Polymer Example 1 | Conditions for Polymer Example 2 |
| Reactor Temp (° C.) | 70 | 70 |
| Ethylene partial pressure (psi) | 170 | 170 |
| H2/C2 molar ratio | 0.00289 | 0.00413 |
| C4/C2 molar ratio | 0.036 | 0.039 |

The reactor granules of Examples 1 and 2 were dry blended with additives before being compounded on a 2.5" Davis-Standard single-screw extruder equipped with mixing pins and underwater pelletizer at an output rate was approximately 100 lb/hr. The compounded pellets of examples 1 and 2 were then film extruded on a 2.5" Gloucester line with a 6" oscillating die and an air ring from Future Design Inc. (Mississauga, Ontario, Canada). The output rate was about 150 lbs/hr (8 lbs/hr-in die circumference) and the die gap was 45 mils. Film gauge was 1 mil and blow up ratio (BUR) varied from 2.5 to 3.5. Frost line height (FLH) was typically 20 to 24". The die temperature was about 199° C. (390° F.).

Table 5 compares the properties of the polymers of Examples 1 and 2 to the properties of the following reference polymers: Borealis Borstar FB2230 (Borealis A/S, Vienna, Austria). Dow DNDA7340 Cr (The Dow Chemical Company, Midland, Mich.). Dow DYNH-1 (The Dow Chemical Company, Midland, Mich.). ExxonMobil LD103.09 (from Exxon Mobil Chemical Company, Houston, Tex.). The films of reference were made under similar conditions on the same film line.

TABLE 5

Properties of Polymers of Examples 1 and 2 and Reference Polymers

| | Units | Ex. 1 | Ex. 2 | Borealis Borstar FB2230 | Dow DNDA7340 | Dow DYNH-1 |
|---|---|---|---|---|---|---|
| Density | grams/cc | 0.9215 | 0.9220 | 0.9232 | 0.9230 | 0.9195 |
| $I_2$ (MI) | grams/10 min | 0.21 | 0.79 | 0.24 | 0.57 | 2.04 |
| $I_{21}$ (FI) | grams/10 min | 32.4 | 66.3 | 23.3 | 45.2 | 102.7 |
| MFR | — | 157 | 84 | 97 | 79 | 50 |
| $M_n$ | — | 22301 | 20381 | 9460 | 10310 | 14750 |
| $M_w$ | — | 93130 | 73968 | 192800 | 89730 | 89840 |
| $M_z$ | — | 226153 | 166365 | | 336880 | 268560 |
| MWD(PDI) ($M_w/M_n$) | — | 4.2 | 3.6 | 20.4 | 8.7 | 6.1 |
| LCB ($g'_{avg}$ vis. avg.) | | 0.6 | 0.70 | ~1.0 | 0.97 | 0.41 |
| LCB (g' @ 100,000 MW) | | 0.9 | 0.90 | — | 0.96 | 0.48 |
| LCB (g' @ 500,000 MW) | | 0.71 | 0.74 | — | 0.98 | 0.25 |
| Die Gap | mil | 45, 45 | 45, 45 | | 50 | 45, 45 |
| BUR | — | 2.5, 3.2 | 2.5, 3.2 | | 2.5 | 2.5, 3.5 |
| Gauge | mil | 2.12, 2.09 | 1.96, 2.09 | | 1.95 | 1.97, 1.98 |
| Haze | % | 11, 9.6 | 6.3, 6.7 | | 29.7 | 8.1, 7.54 |
| Internal Haze | % | 1.20, 1.02 | 1.75, 1.94 | | 2.23 | 1.09, 1.37 |
| Normalized Internal Haze | %/mil | 0.57, 0.49 | 0.89, 0.93 | | 1.14 | 0.55, 0.69 |
| Clarity | % | 59, 62 | 74, 70 | | 1 | 36, 54 |
| MD Retromat Shrinkage | % | 64, 60 | 66, 60 | | 75 | 75, 71 |
| TD Retromat Shrinkage | % | 5.0, 19.3 | -7.5, 4.3 | | -10.8 | -12.5, 3.3 |
| Area Retromat Shrinkage | % | 65, 68 | 63, 62 | | 72 | 72, 72 |
| MD plastic shrink tension | MPa | 0.080, 0.074 | 0.065, 0.046 | | 0.155 | 0.095, 0.083 |
| MD thermal shrink tension | MPa | 0.548, 1.099 | 0.891, 1.074 | | break | 0.697, 0.939 |
| TD thermal shrink tension | MPa | 0.952, 1.110 | 1.008, 0.984 | | 0.000 | 0.500, 0.761 |
| Melt Strength | cN | 6.9 | 4.7 | 11.2 | 9.8 | 12.8 |
| Strain Hardening | — | no | yes | no | no | |
| T75 | | 83 | 81.6 | | 95.1 | 90.3 |
| T25 | | 75.5 | 73.2 | | 68.3 | 65.9 |
| T75 − T25 | | 7.5 | 8.4 | | 26.8 | 24.4 |

| | Units | ExxonMobil LD103.09 | Polymer produced using $Me_2Si(H_4In)_2ZrCl_2$ as a catalyst | Polymer produced using $Me_2Si(H_4In)_2ZrCl_2$ as a catalyst |
|---|---|---|---|---|
| Density | grams/cc | 0.9202 | 0.9194 | 0.927 |
| $I_2$ (MI) | grams/10 min | 1.06 | 0.94 | 0.59 |
| $I_{21}$ (FI) | grams/10 min | 59.4 | 35.8 | 29.4 |
| MFR | — | 56 | 38 | 50 |
| $M_n$ | — | 17730 | 24563 | 30699 |
| $M_w$ | — | 116410 | 97355 | 107489 |
| $M_z$ | — | 318880 | 208826 | 248888 |
| MWD(PDI) ($M_w/M_n$) | — | 6.6 | 4.0 | 3.5 |

TABLE 5-continued

Properties of Polymers of Examples 1 and 2 and Reference Polymers

| | | | | |
|---|---|---|---|---|
| LCB (g'$_{avg}$ vis. avg.) | | 0.37 | 0.99 | 0.98 |
| LCB (g' @ 100,000 MW) | | 0.46 | 1.00 | 1.00 |
| LCB (g' @ 500,000 MW) | | 0.25 | 0.89 | 0.89 |
| Die Gap | mil | 45 | | 30, 60 |
| BUR | — | 2.5 | | 3.5, 2.5 |
| Gauge | mil | 1.97 | | 2.05, 2.08 |
| Haze | % | 11.3 | | 10.7, 13.5 |
| Internal Haze | % | 0.70 | | 2.99, 3.27 |
| Normalized Internal Haze | %/mil | 0.36 | | 1.46, 1.57 |
| Clarity | % | 31 | | 67, 66 |
| MD Retromat Shrinkage | % | 79 | | 52, 64 |
| TD Retromat Shrinkage | % | 2.8 | | 4.5, −15.0 |
| Area Retromat Shrinkage | % | 79 | | 54, 59 |
| MD plastic shrink tension | MPa | 0.167 | | 0.029, 0.046 |
| MD thermal shrink tension | MPa | 0.921 | | 1.213, 1.216 |
| TD thermal shrink tension | MPa | 0.708 | | 1.335, 0.246 |
| Melt Strength | cN | 19.5 | | 5.7 |
| Strain Hardening | — | yes | | |
| T75 | | | 81.6 | 88.2 |
| T25 | | | 75.3 | 83.6 |
| T75 − T25 | | | 6.3 | 4.6 |

Example 3

CAT B

As shown in this example, a polymer of an embodiment of the invention can improve the optical properties of other LLDPE polymers when it is blended in as a minor component. In this example, a polymer of an embodiment of this invention was blended in at 10% (by weight) of the final product using an on-line blending set-up on a Battenfeld Gloucester (Gloucester, Mass.) film line. In this set-up, the blend components were weighted separately according to the blend ratio and added to a mixing chamber, where the components were mixed by agitation before they were discharged into a feed hopper above the extruder. The line was equipped with a 2.5" single screw extruder, a 6" oscillating die and an air ring from Future Design Inc. (Mississauga, Ontario, Canada). The output rate was 151 lbs/hr (8 lbs/hr-in dir circumference) and the die gap was 45 mil. Film gauge was 1 mil and BUR was held constant at 2.5. FLH was typically 20 to 24". The die temperature was 390° F. Table 6 shows these haze improvements for different blends.

TABLE 6

Haze improvements for LLDPE where 10 wt. % $(C_4H_8)Si(C_5Me_4)(C_5H_4)ZrMe_2$ of catalyzed product was added.

| Catalyst | Average Gauge (mil) | Film Haze (%) | Internal Haze (%) | MD Tear (g/mil) | TD Tear (g/mil) | Specific Output (lb/hp-hr) |
|---|---|---|---|---|---|---|
| 100% (1,3-Me, n-Bu-Cp)$_2$ZrCl$_2$ | 0.97 | 19.6 | 1.54 | 244 | 355 | 11.26 |
| 90% (1,3-Me, n-Bu-Cp)$_2$ZrCl$_2$/ 10% $(C_4H_8)Si(C_5Me_4)(C_5H_4)ZrMe_2$ | 0.97 | 3.4 | 0.97 | 238 | 482 | 12.11 |
| 100% LD103.09 | 0.98 | 11.0 | 2.27 | 381 | 588 | 14.79 |
| 90% LD103.09/ 10% $(C_4H_8)Si(C_5Me_4)(C_5H_4)ZrMe_2$ | 0.99 | 9.7 | 1.94 | 274 | 650 | 14.17 |
| 100% $C_5H_4$—$CH_2CH_2CH_3)_2Hf(CH_3)_2$ | 0.97 | 25.1 | 2.46 | 248 | 389 | 14.63 |
| 90% $C_5H_4$—$CH_2CH_2CH_3)_2Hf(CH_3)_2$/ 10% $(C_4H_8)Si(C_5Me_4)(C_5H_4)ZrMe_2$ | 1.00 | 7.2 | 1.92 | 239 | 489 | 15.05 |
| 100% $C_5H_4$—$CH_2CH_2CH_3)_2Hf(CH_3)_2$ | 0.98 | 11.5 | 2.24 | 304 | 425 | 12.62 |
| 90% $C_5H_4$—$CH_2CH_2CH_3)_2Hf(CH_3)_2$/ | 1.00 | 6.5 | 1.79 | 239 | 524 | 13.11 |

TABLE 6-continued

Haze improvements for LLDPE where 10 wt. %
$(C_4H_8)Si(C_5Me_4)(C_5H_4)ZrMe_2$ of catalyzed product was added.

| Catalyst | Average Gauge (mil) | Film Haze (%) | Internal Haze (%) | MD Tear (g/mil) | TD Tear (g/mil) | Specific Output (lb/hp-hr) |
|---|---|---|---|---|---|---|
| 10% $(C_4H_8)Si(C_5Me_4)(C_5H_4)ZrMe_2$ 100% $(C_4H_8)Si(C_5Me_4)(C_5H_4)ZrMe_2$ * | 0.99 | 8.7 | 0.84 | 25 | 324 | 21.43 |

This polymer has a density of 0.9220 grams/cc, an MI ($I_2$) of 0.76 grams/10 min and a MFR of 99.3. It was made using CAT B under similar conditions as Examples 1 and 2.

When a polymer of an embodiment of the invention is blended into other LLDPE polymers as a minor component, in addition to the benefit of enhancing the base polymer's optical properties, the polymer also improves their TD tear resistance while largely maintains their MD tear resistance unchanged or causes insignificant or small loss. In contrast, when these LLDPEs are blended with HP-LDPE to improve optical properties, the loss in toughness is dramatic. Additionally, blending such polymers also improves the extrusion performance of the base polymers, as indicated by the increase in the specific output (lbs/hp-hr), making the extrusion process more energy efficient.

Example 4

Polymers were prepared from ethylene ($C_2$) and butene-1 (C4) monomers in a pilot-scale continuous gas phase fluidized bed reactor using $(CH_2)_4Si(C_5Me_4)(C_5H_5)ZrMe_2$ (CAT A). The reactor was operated at temperatures of 70° C. and 85° C., and ethylene partial pressures of 170 and 220 psi. The fluidized bed was made up of polymer granules and the average bed weight was approximately 100 to 170 lbs. During the reaction, aluminum distearate was added to the reactor as a 20 wt % slurry in mineral oil at concentrations on a resin basis from 6 and 24 ppmw (parts per million weight). The comonomer concentration in the reactor was changed; its effect on product was recorded, and is shown below in Tables 9 and 9.

For comparative purpose, a polymer was generated using $Me_2Si(H_4In)_2ZrCl_2$ as the catalyst. The reactor was operating at 85° C. and 220 psi ethylene partial pressure. The comonomer, butene-1, concentration was changed from approximately 1.4 mol. % to approximately 4.6 mol. %, with other process parameters held constant. The melt flow index (MI or $I_2$) of the product only changed from approximately 2.0 to 0.9 g/10 min.

TABLE 7

MI change using $Me_2Si(H_4In)_2ZrCl_2$ as catalyst (Comparative)

| Time (hr) | Reactor Temperature (° C.) | Ethylene Partial Pressure (psi) | H2/C2 Ratio | Ethylene (Mol. %) | Butene-1 (Mol. %) | C4/C2 ratio | Product $I_2$ (g/10 min) | Product Density (g/cc) |
|---|---|---|---|---|---|---|---|---|
| 1 | 84.97 | 220.29 | 0.0003 | 65.51 | 1.40 | 0.0213 | 1.67 | 0.9230 |
| 2 | 84.99 | 221.24 | 0.0003 | 65.69 | 1.35 | 0.0206 | | |
| 3 | 85.02 | 219.73 | 0.0003 | 65.34 | 1.33 | 0.0204 | | |
| 4 | 84.98 | 218.62 | 0.0003 | 64.97 | 1.32 | 0.0204 | 1.93 | 0.9226 |
| 5 | 85.00 | 221.23 | 0.0003 | 65.64 | 1.32 | 0.0201 | | |
| 6 | 84.99 | 221.28 | 0.0003 | 65.68 | 1.36 | 0.0206 | | |
| 7 | 85.00 | 220.17 | 0.0003 | 65.51 | 1.41 | 0.0215 | 2.06 | 0.9330 |
| 8 | 85.03 | 219.94 | 0.0003 | 65.35 | 1.41 | 0.0215 | | |
| 9 | 85.00 | 218.70 | 0.0003 | 65.04 | 1.40 | 0.0216 | | |
| 10 | 84.98 | 218.86 | 0.0003 | 64.99 | 1.40 | 0.0216 | 1.90 | 0.9341 |
| 11 | 84.99 | 221.53 | 0.0003 | 65.75 | 1.41 | 0.0214 | | |
| 12 | 85.01 | 221.14 | 0.0002 | 65.72 | 1.41 | 0.0215 | | |
| 13 | 84.98 | 220.57 | 0.0002 | 65.60 | 1.41 | 0.0215 | 1.73 | 0.9347 |
| 14 | 85.06 | 219.04 | 0.0002 | 65.05 | 1.41 | 0.0217 | | |
| 15 | 85.02 | 218.27 | 0.0002 | 64.89 | 1.41 | 0.0218 | | |
| 16 | 85.01 | 218.05 | 0.0002 | 64.88 | 1.40 | 0.0216 | 1.54 | 0.9341 |
| 17 | 84.97 | 220.70 | 0.0002 | 65.39 | 1.42 | 0.0216 | | |
| 18 | 85.04 | 220.92 | 0.0002 | 65.51 | 1.61 | 0.0245 | | |
| 19 | 84.95 | 220.91 | 0.0002 | 65.46 | 1.26 | 0.0192 | 1.39 | 0.9333 |
| 20 | 85.08 | 218.27 | 0.0002 | 64.79 | 1.96 | 0.0301 | | |
| 21 | 84.93 | 217.84 | 0.0002 | 64.77 | 2.30 | 0.0356 | | |
| 22 | 84.84 | 224.06 | 0.0002 | 66.23 | 2.92 | 0.0439 | 1.31 | 0.9311 |
| 23 | 85.30 | 220.91 | 0.0002 | 65.44 | 3.42 | 0.0522 | | |
| 24 | 84.91 | 218.60 | 0.0002 | 64.52 | 3.97 | 0.0610 | | |
| 25 | 84.84 | 220.58 | 0.0002 | 65.72 | 4.47 | 0.0681 | 1.17 | 0.9255 |
| 26 | 85.38 | 219.43 | 0.0002 | 65.24 | 4.55 | 0.0698 | | |
| 27 | 84.85 | 216.03 | 0.0002 | 64.27 | 4.62 | 0.0720 | | |
| 28 | 84.99 | 223.20 | 0.0002 | 66.08 | 4.53 | 0.0682 | 0.94 | 0.9195 |
| 29 | 84.99 | 221.31 | 0.0002 | 65.95 | 4.59 | 0.0696 | | |
| 30 | 84.96 | 222.07 | 0.0002 | 65.90 | 4.58 | 0.0693 | | |
| 31 | 85.07 | 219.31 | 0.0002 | 65.36 | 4.59 | 0.0704 | 0.85 | 0.9182 |
| 32 | 84.92 | 220.94 | 0.0002 | 65.73 | 4.55 | 0.0693 | | |
| 33 | 85.01 | 220.87 | 0.0003 | 65.73 | 4.60 | 0.0699 | | |
| 34 | 84.99 | 220.55 | 0.0003 | 65.54 | 4.58 | 0.0698 | 0.93 | 0.9180 |

$(CH_2)_4Si(C_5Me_4)(C_5H_5)ZrMe_2$ (CAT A) was used to produce ethylene ($C_2$) and butene-1 ($C_4$) copolymer in a pilot-scale continuous gas phase fluidized bed reactor. The reactor temperature was at 70° C. and reactor ethylene partial pressure was at approximately 150 psi. The comonomer, butene-1, concentration was changed from approximately 1.3 mol. % to approximately 0.7 mol. %, with other process parameters held constant. Results are shown in Table 8. The melt index (MI or $I_2$) of the product changed significantly from approximately 5 to 20 g/10 min.

TABLE 8

MI change using $(CH_2)_4Si(C_5Me_4)(C_5H_5)ZrMe_2$ (CAT A) as catalyst

| Time (hr) | Reactor Temperature (° C.) | Ethylene Partial Pressure (psi) | H2/C2 Ratio | Ethylene (Mol. %) | Butene-1 (Mol. %) | C4/C2 ratio | Product I2 (g/10 min) |
|---|---|---|---|---|---|---|---|
| 1 | 66.89 | 149.11 | 0.0031 | 44.57 | 1.34 | 0.0301 | |
| 2 | 36.35 | 150.87 | 0.0030 | 45.07 | 1.33 | 0.0298 | 4.98 |
| 3 | 51.15 | 154.37 | 0.0029 | 45.52 | 1.31 | 0.0287 | |
| 4 | 70.12 | 146.13 | 0.0028 | 43.18 | 0.93 | 0.0214 | |
| 5 | 70.00 | 149.45 | 0.0027 | 44.24 | 0.52 | 0.0119 | |
| 6 | 69.98 | 154.75 | 0.0030 | 45.82 | 0.53 | 0.0115 | |
| 7 | 69.97 | 151.98 | 0.0029 | 45.12 | 0.55 | 0.0120 | |
| 8 | 69.96 | 151.65 | 0.0029 | 45.06 | 0.56 | 0.0124 | 3.33 |
| 9 | 70.02 | 151.81 | 0.0029 | 45.03 | 0.60 | 0.0132 | |
| 10 | 70.02 | 151.62 | 0.0029 | 45.00 | 0.61 | 0.0137 | |
| 11 | 70.01 | 149.30 | 0.0029 | 44.26 | 0.62 | 0.0141 | |
| 12 | 70.02 | 146.60 | 0.0030 | 43.60 | 0.63 | 0.0143 | |
| 13 | 69.99 | 147.00 | 0.0029 | 43.66 | 0.59 | 0.0136 | |
| 14 | 70.02 | 148.02 | 0.0029 | 43.90 | 0.57 | 0.0131 | 6.14 |
| 15 | 70.04 | 148.15 | 0.0029 | 43.95 | 0.58 | 0.0132 | |
| 16 | 70.04 | 147.77 | 0.0028 | 43.84 | 0.70 | 0.0160 | |
| 17 | 69.97 | 148.89 | 0.0028 | 44.00 | 0.70 | 0.0160 | |
| 18 | 70.00 | 149.86 | 0.0029 | 44.43 | 0.71 | 0.0159 | |
| 19 | 70.02 | 149.44 | 0.0029 | 44.29 | 0.71 | 0.0160 | |
| 20 | 70.00 | 149.48 | 0.0029 | 44.37 | 0.71 | 0.0159 | 16.41 |
| 21 | 70.01 | 150.06 | 0.0029 | 44.47 | 0.70 | 0.0158 | |
| 22 | 70.02 | 149.90 | 0.0029 | 44.52 | 0.71 | 0.0159 | |
| 23 | 70.04 | 150.04 | 0.0029 | 44.60 | 0.71 | 0.0159 | 19.70 |
| 24 | 69.99 | 149.73 | 0.0029 | 44.43 | 0.72 | 0.0161 | |
| 25 | 70.02 | 148.84 | 0.0028 | 44.18 | 0.76 | 0.0170 | |
| 26 | 70.01 | 149.56 | 0.0027 | 44.26 | 0.86 | 0.0193 | 19.98 |

This experiment was repeated one more time, also using $(CH_2)_4Si(C_5Me_4)(C_5H_5)ZrMe_2$ (CAT A) as catalyst, but at somewhat different reactor conditions. The reactor temperature was the same at 70° C., but the reactor ethylene partial pressure was at 170 psi and the $H_2/C_2$ ratio was at approximately 0.0040. The reactor was steadily making approximately 1.0 (g/10 min) Melt Index product for extended period of time before the comonomer, butene-1, concentration was changed from approximately 2.0 mol. % to approximately 0.55 mol %, with other process parameters held constant. Results are shown in Table 9. The melt index (MI or $I_2$) of the product changed dramatically from 1.0 to over 100 g/10 min. This level of change is very significant and unexpected from other metallocene catalysts such as $Me_2Si(H_4In)_2ZrCl_2$ given in the comparative example.

TABLE 9

MI change using $(CH_2)_4Si(C_5Me_4)(C_5H_5)ZrMe_2$ (CAT A) as catalyst under somewhat different reaction conditions

| Time (hr) | Reactor Temperature (C.) | Ethylene Partial Pressure (psi) | H2/C2 Ratio | Ethylene (Mol. %) | Butene-1 (Mol. %) | C4/C2 ratio | Product I2 (g/10 min) | Product Density (g/cc) |
|---|---|---|---|---|---|---|---|---|
| 1 | 69.99 | 166.90 | 0.0043 | 49.63 | 1.97 | 0.0398 | 1.06 | 0.9217 |
| 2 | 69.96 | 169.27 | 0.0041 | 50.25 | 1.94 | 0.0387 | | |
| 3 | 69.99 | 170.68 | 0.0042 | 50.58 | 1.92 | 0.0379 | | |
| 4 | 70.02 | 171.23 | 0.0042 | 50.76 | 1.91 | 0.0375 | 0.89 | 0.9217 |
| 5 | 70.05 | 169.96 | 0.0042 | 50.42 | 1.88 | 0.0372 | | |
| 6 | 70.04 | 168.85 | 0.0042 | 50.11 | 1.87 | 0.0372 | | |
| 7 | 69.97 | 169.91 | 0.0042 | 50.23 | 1.88 | 0.0373 | 0.95 | 0.9217 |
| 8 | 70.02 | 169.44 | 0.0042 | 50.38 | 1.87 | 0.0372 | | |

TABLE 9-continued

MI change using (CH$_2$)$_4$Si(C$_5$Me$_4$)(C$_5$H$_5$)ZrMe$_2$ (CAT A) as catalyst under somewhat different reaction conditions

| Time (hr) | Reactor Temperature (C.) | Ethylene Partial Pressure (psi) | H2/C2 Ratio | Ethylene (Mol. %) | Butene-1 (Mol. %) | C4/C2 ratio | Product I2 (g/10 min) | Product Density (g/cc) |
|---|---|---|---|---|---|---|---|---|
| 9  | 70.04 | 167.54 | 0.0042 | 49.88 | 1.85 | 0.0374 |       |        |
| 10 | 70.00 | 169.18 | 0.0042 | 50.22 | 1.88 | 0.0374 | 0.95  | 0.9219 |
| 11 | 70.10 | 167.89 | 0.0042 | 49.95 | 1.95 | 0.0391 |       |        |
| 12 | 69.97 | 168.13 | 0.0042 | 50.00 | 1.96 | 0.0392 |       |        |
| 13 | 70.01 | 169.57 | 0.0041 | 50.31 | 1.96 | 0.0389 | 0.97  | 0.9221 |
| 14 | 69.96 | 170.48 | 0.0042 | 50.53 | 1.98 | 0.0391 |       |        |
| 15 | 70.02 | 170.09 | 0.0042 | 50.50 | 1.97 | 0.0390 |       |        |
| 16 | 70.01 | 168.75 | 0.0042 | 50.22 | 1.96 | 0.0391 | 0.88  | 0.9216 |
| 17 | 69.99 | 170.69 | 0.0042 | 50.63 | 1.98 | 0.0390 |       |        |
| 18 | 70.01 | 170.48 | 0.0042 | 50.60 | 1.98 | 0.0390 |       |        |
| 19 | 69.99 | 170.17 | 0.0042 | 50.49 | 1.98 | 0.0390 | 0.83  | 0.9213 |
| 20 | 70.03 | 169.57 | 0.0042 | 50.39 | 1.97 | 0.0391 |       |        |
| 21 | 70.01 | 168.50 | 0.0041 | 50.10 | 1.95 | 0.0389 |       |        |
| 22 | 70.00 | 170.52 | 0.0041 | 50.56 | 1.97 | 0.0389 | 0.80  | 0.9209 |
| 23 | 69.97 | 169.99 | 0.0041 | 50.61 | 1.97 | 0.0391 |       |        |
| 24 | 69.94 | 171.83 | 0.0041 | 51.08 | 1.99 | 0.0389 |       |        |
| 25 | 69.99 | 172.83 | 0.0041 | 51.10 | 2.00 | 0.0389 | 0.78  | 0.9204 |
| 26 | 70.04 | 169.70 | 0.0042 | 50.63 | 1.98 | 0.0392 |       |        |
| 27 | 69.98 | 170.21 | 0.0042 | 50.44 | 1.98 | 0.0391 |       |        |
| 28 | 70.02 | 169.22 | 0.0042 | 50.27 | 1.96 | 0.0390 | 0.77  | 0.9208 |
| 29 | 70.01 | 169.60 | 0.0041 | 50.39 | 1.81 | 0.0361 |       |        |
| 30 | 69.95 | 170.91 | 0.0040 | 50.78 | 0.91 | 0.0180 |       |        |
| 31 | 69.99 | 171.78 | 0.0039 | 50.92 | 0.59 | 0.0116 | 0.91  | 0.9221 |
| 32 | 70.02 | 169.48 | 0.0039 | 50.38 | 0.57 | 0.0113 |       |        |
| 33 | 70.02 | 167.94 | 0.0038 | 50.05 | 0.57 | 0.0114 |       |        |
| 34 | 70.09 | 168.98 | 0.0037 | 50.14 | 0.55 | 0.0110 | 2.56  | 0.9266 |
| 35 | 69.91 | 170.01 | 0.0037 | 50.81 | 0.54 | 0.0106 |       |        |
| 36 | 70.01 | 172.03 | 0.0039 | 51.18 | 0.55 | 0.0108 |       |        |
| 37 | 69.98 | 170.23 | 0.0040 | 50.80 | 0.54 | 0.0107 | 14.07 | 0.9359 |
| 38 | 70.03 | 169.92 | 0.0040 | 50.87 | 0.56 | 0.0110 |       |        |
| 39 | 70.00 | 169.47 | 0.0040 | 50.55 | 0.55 | 0.0109 |       |        |
| 40 | 70.00 | 170.20 | 0.0040 | 50.74 | 0.55 | 0.0108 | 51.41 | 0.9408 |
| 41 | 70.00 | 170.15 | 0.0040 | 50.75 | 0.56 | 0.0110 |       |        |
| 42 | 70.01 | 169.70 | 0.0040 | 50.66 | 0.56 | 0.0111 |       |        |
| 43 | 70.00 | 169.36 | 0.0040 | 50.56 | 0.56 | 0.0111 | 84.96 | 0.9432 |
| 44 | 69.95 | 171.02 | 0.0040 | 50.94 | 0.56 | 0.0109 |       |        |
| 45 | 69.96 | 172.51 | 0.0041 | 51.32 | 0.57 | 0.0111 |       |        |
| 46 | 69.98 | 172.44 | 0.0042 | 51.36 | 0.57 | 0.0112 | 129.30 | 0.9454 |

Example 5

When subjected to uniaxial extension, the extensional viscosity of a polymer increases with strain rate. The transient uniaxial extensional viscosity of a linear polymer can be predicted as is known to those skilled in the art. Strain hardening occurs when the polymer is subjected uniaxial extension and the transient extensional viscosity increases more than what is predicted from linear viscoelastic theory. The strain hardening index, as herein defined, is the ratio of the observed to the theoretically predicted transient uniaxial extensional viscosity in the extensional viscosity measurement, i.e. Strain hardening index=$\eta_{E\ obs(e=3)}^{+}/\eta_{E\ pred(e=3)}^{+}$.

FIGS. 1 and 2 show strain hardening at 150° C. of ethylene/hexene copolymers of an embodiment of the instant invention prepared using a lab-scale gas phase reactor and CAT C as a catalyst (Example 5 and FIG. 2). This is compared to Exxon-Mobil LD103.09 (from ExxonMobil Chemical Company, Houston, Tex.) (FIG. 1). The samples were compounded on a Haake Polylab system (Thermo Fisher Scientific, Inc., Waltham, Mass.) and blown into films on a Haake-Brabender combination system (Thermo Fisher Scientific, Inc., Waltham, Mass.). In FIGS. 1 and 2, the strain, e=3, is at time 3s divided by strain rate. The data for example 5 are shown in Table 10.

TABLE 10

Strain Hardening of the polymers of example 5 (FIG. 2)

| Strain Rate | Strain | Predicted | Measured | Strain Hardening index |
|---|---|---|---|---|
| 10 s−1  | 3 | 19221.60  | 71170.00  | 3.70 |
| 1 s−1   | 3 | 73299.80  | 184900.00 | 2.52 |
| 0.1 s−1 | 3 | 205483.68 | 547000.00 | 2.66 |

In an embodiment of the invention, the polymer exhibits a strain hardening index of greater than 2, or greater than 2.5, or about 2.5 to about 3.7.

FIG. 3 is a graph of MFR v. MI for polymers of embodiments of the instant invention (using (C$_4$H$_8$)Si(C$_5$Me$_4$)(C$_5$H$_4$)ZrMe$_2$ as the catalyst) and comparative polymers. As seen from this Figure, polymers of embodiments of the instant invention satisfy the following relations: MFR>(49.011×MI$^{(-0.4304)}$) and MFR>(57.18×MI$^{(-0.4304)}$).

Figure 4:
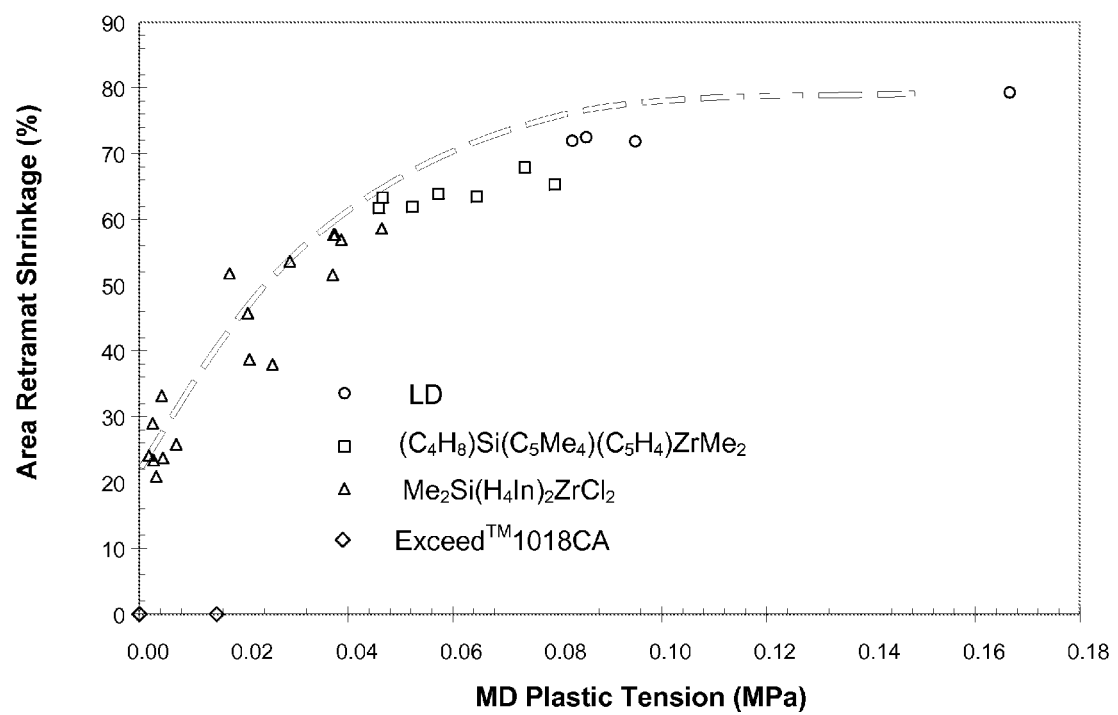
FIG. 4 is a graph of Area Retramat shrinkage v. MD Plastic Force for polymers of embodiments of the instant invention and comparative polymers.

FIG. 4 is a graph of Retramat shrinkage v. MD Plastic Force for films made from polymers of embodiments of the instant invention (using (C$_4$H$_8$)Si(C$_5$Me$_4$)(C$_5$H$_4$)ZrMe$_2$ as the catalyst) including Examples 1 and 2, and comparative films. As seen from this Figure, the films of embodiments of the instant invention generally have an area Retromat shrinkage of greater than 60% and an MD plastic tension of less than about 0.08 MPa.

Figure 5:
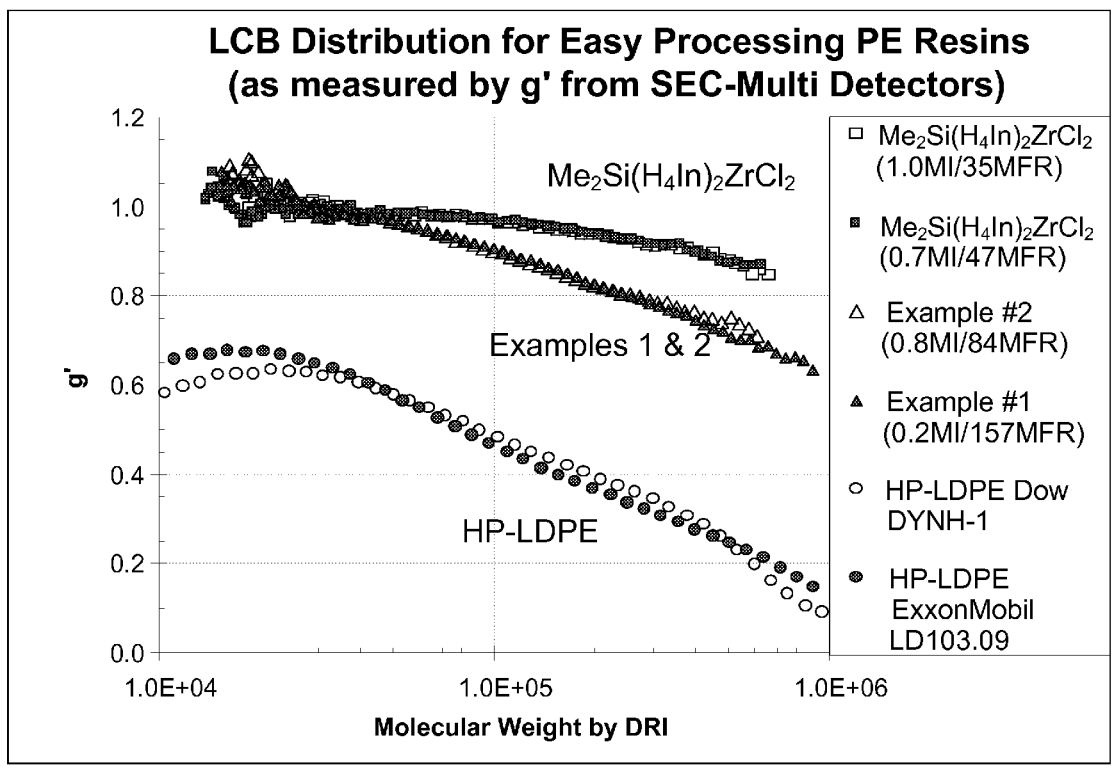
FIG. 5 is a graph of g' v. molecular weight for polymers of embodiments of the instant invention and comparative polymers.

FIG. 5 is a graph of $g'_{avg}$ v. molecular weight for polymers of embodiments of the instant invention (using $(C_4H_8)Si(C_5Me_4)(C_5H_4)ZrMe_2$ as the catalyst) and comparative polymers. As seen from this Figure, polymers of embodiments of the instant invention satisfy the following relations: $0.5 \leq g'_{avg} \leq 0.9$ and $M_w/M_n \leq 4.6$.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

We claim:

1. A polyethylene comprising monomers of ethylene and butene, having:
   a long chain branching index of $0.5 \leq g'avg \leq 0.9$;
   a melt index ratio (MIR), $I_{21}/I_2$, of $>(49.011 \times MI^{(-0.4304)})$, where MI is Melt Index; and
   a weight average molecular weight to number average molecular weight $Mw/Mn \leq 4.6$.

2. The polyethylene of claim 1 having $0.55 \leq g'avg \leq 0.85$.

3. The polyethylene of claim 1 having an $MIR > (57.18 \times MI^{(-0.4304)})$.

4. The polyethylene of claim 1 having about $2.0 \leq Mw/Mn \leq$ about 4.2.

5. The polyethylene of claim 1 having $0.75 \leq g'$ at a molecular weight of $100,000 \leq 0.95$.

6. The polyethylene of claim 1 having $0.5 \leq g'$ at a molecular weight of $500,000 \leq 0.85$.

7. The polyethylene of claim 1 having a T75−T25 value of equal to or lower than about 25, wherein T25 is the temperature at which 25% of the eluted polymer is obtained and T75 is the temperature at which 75% of the eluted polymer is obtained.

8. The polyethylene of claim 1 having an $MI \leq$ about 1.0.

9. The polyethylene of claim 1 having a melt flow rate, (MFR) of about 50-150 at an MI of about 1.0.

10. The polyethylene claim 1 having a melt strength of <10 cN.

11. The polyethylene of claim 1 having a density of 0.910-0.945 g/cc.

12. The polyethylene of claim 1 wherein the composition comprises as monomers ethylene, butene, and another olefin monomer having from 2 to 30 carbon atoms.

13. A film comprising the polyethylene of claim 1.

14. The film of claim 13, wherein the film has an MD plastic shrink tension≤about 0.08 MPa.

15. The film of claim 13, wherein the film has an area Retromat shrinkage>60%.

16. The film of claim 13, wherein the film has a clarity≥60%.

17. The film of claim 13, wherein the film has a normalized internal haze≤1.0%/mil.

18. The film of claim 13, wherein the film has a haze<20%.

19. A gas phase process for polymerizing olefins to produce the polymer of claim 1 comprising contacting the olefins, under polymerization conditions, with a catalyst system comprising an achiral cyclic bridged metallocene catalyst compound and an activator, wherein the activator comprises alumoxane, a modified alumoxane, or a mixture thereof, wherein the olefins include ethylene and butene, and wherein the achiral cyclic bridged metallocene catalyst compound is represented by the formula:

LA(R'AxR')LBMQn wherein M is a Group 4 transition metal; LA and LB is an unsubstituted or substituted, cyclopentadienyl or cyclopentadienyl-type ligand bonded to M; (R'AxR') is a cyclic bridging group wherein A is one or more of, or a combination of carbon, germanium, silicon or tin bridging LA and LB, and the two R''s form a cyclic ring or ring system with A; Qn is dimethyl; x is an integer from 1 to 4; and one of LA or LB is a substituted cyclopentadienyl or a substituted cyclopentadienyl-type ligand.

20. The process of claim 19, wherein M is zirconium.

21. The process of claim 19, wherein the achiral cyclic bridged metallocene catalyst compound is cyclotetramethylenesilyl(tetramethyl cyclopentadienyl)(cyclopentadienyl)zirconium dimethyl.

22. The process of claim 19, wherein the catalyst system comprises a support, wherein the support comprises a Group 2, 3, 4, 5, 13 or 14 metal inorganic oxide.

23. The process of claim 22, wherein the support comprises silica, alumina, or silica-alumina.

24. The process of claim 19, wherein the activator comprises methylaluminoxane (MAO), modified methylaluminoxane (MMAO), or a combination thereof.

25. The process of claim 19, wherein the activator is MAO, wherein the catalyst system is formed by first combining the MAO and the silica, and then by adding thereto the cyclotetramethylenesilyl (tetramethylcyclopentadienyl)(cyclopentadienyl)zirconium dimethyl.

26. The process of claim 19, wherein the butene/ethylene ratio, by mol % used in the process is <0.007.

* * * * *